Patented June 23, 1953

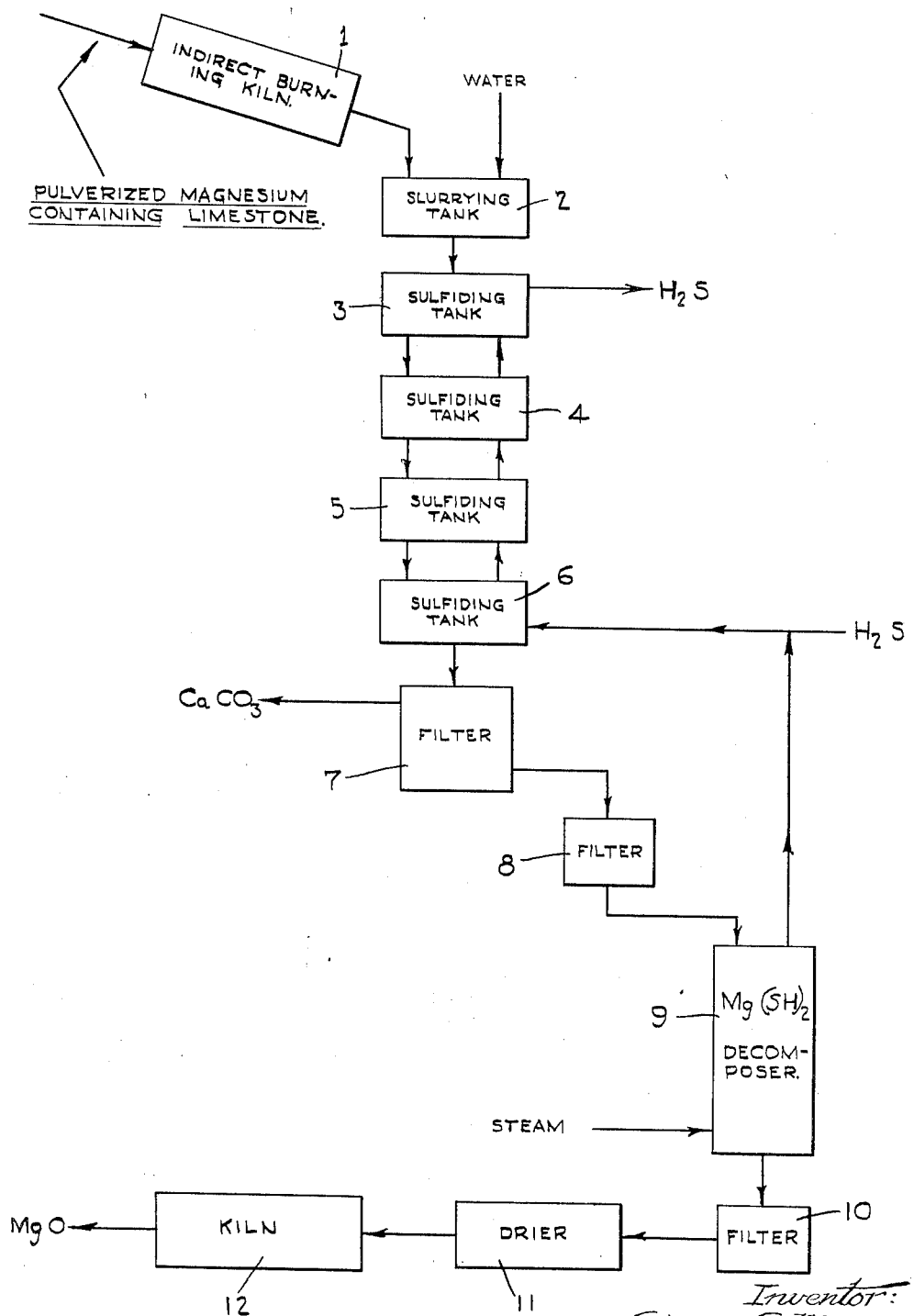

2,643,181

UNITED STATES PATENT OFFICE 2,643,181

PROCESS OF MAKING RELATIVELY PURE MAGNESIUM OXIDE OR HYDROXIDE

George G. Megrail, Phoenixville, Pa., assignor to Warner Company, Philadelphia, Pa., a corporation of Delaware Application August 15, 1949, Serial No. 110,376

10 Claims. (Cl. 23—201)

The present invention relates to a method of producing substantially pure magnesium oxide or hydroxide, and more particularly, it relates to an improvement in the processes which have been suggested for the production of magnesium oxide, in which the magnesium oxide in admixture with calcium carbonate and impurities is selectively reacted, in aqueous medium, with hydrogen sulfide to produce soluble magnesium hydrosulfide, followed by the separation of the solution from residual solids, the conversion of the hydrosulfide to the hydroxide and the calcination of the hydroxide to form the oxide when the latter product is desired.

One of the suggested methods for producing magnesium oxide involves the treatment, in an aqueous medium with hydrogen sulfide gas, of a comminuted selectively burned magnesium-containing limestone, such as dolomitic limestone, in which the magnesium carbonate has, by a standard burning operation, been substantially converted to magnesium oxide with as little decomposition of the calcium carbonate as possible. This treatment with hydrogen sulfide converts the magnesium oxide in the mixture plus any contaminating calcium oxide to the water-soluble hydrosulfides, the solution of the latter compounds being separated from residual solids including calcium carbonate and impurities such as iron, silica, and the like. The separated solution of the hydrosulfide is then decomposed, by heat, into magnesium hydroxide, which later is separated from the medium and calcined to the oxide. Soluble calcium hydrosulfide present, while not decomposed to the corresponding hydroxide, contaminates the magnesium hydroxide through absorption, inclusion and occlusion, and also contributes to the loss of sulphur values by passing into the filtrate which is later discarded. To maintain the calcium content of the final product at a minimum, it has been suggested to precipitate preliminarily the free calcium oxide in the mixture by reaction with carbon dioxide.

The selectively burned magnesium-containing limestone employed in this above-described procedure is the product obtained by burning the limestone, usually in the form of lumps, in direct contact with a flame or hot combustion gases, until the magnesium carbonate is substantially converted to the oxide with minimum conversion of the calcium carbonate into calcium oxide. When limestone, so burned, is treated in aqueous medium with the hydrogen sulfide, the maximum concentration of magnesium hydrosulfide obtainable, calculated as $MgO$, has been about 4%. Thus to insure the solubilization of the magnesia content of the selectively burned limestone, large quantities of water have been needed and the amount of desired product in proportion to the bulk of medium treated has been very small. As a result thereof, large quantities of heat have been required to decompose the magnesium hydrosulfide in aqueous medium, per unit of desired product, and large-sized equipment has been required to produce any significant amount of desired product. In addition, the rate of reaction of the magnesia in the directly burned magnesium-containing limestone with the hydrogen sulfide has been relatively slow. Furthermore, with such directly burned limestone substantial amounts of calcium oxide have been associated with the magnesium oxide, and unless measures were taken to remove the calcium oxide prior to treatment with the hydrogen sulfide, an impure final product resulted. As a result of these factors, the process is inefficient and has not been employed to any great extent, if at all, commercially.

It is, therefore, the principal object of the present invention to provide an efficient commercial process for the production of substantially pure magnesium oxide or hydroxide by the hydrogen sulfide method wherein the above-mentioned disadvantages are eliminated.

A further object is to provide a process for the production of substantially pure magnesium oxide wherein the concentration of magnesium hydrosulfide, obtainable as the result of the treatment of an aqueous suspension of a calcium carbonate-magnesium oxide mixture with hydrogen sulfide gas is as high as two or more times that obtainable by prior processes.

Another object is to provide a process for the production of substantially pure magnesium oxide by the hydrogen sulfide method in which the rate of reaction between the magnesium oxide in the calcium carbonate-magnesia mixture and the hydrogen sulfide is substantially greater than in prior processes.

Still another object is to provide a process for the production of substantially pure magnesium oxide by the hydrogen sulfide method wherein it is unnecessary to remove calcium oxide from the raw calcium carbonate-magnesium oxide mixture prior to the treatment with the hydrogen sulfide.

Other objects will be apparent from a consideration of the following specification and the claims.

The process of the present invention comprises introducing hydrogen sulfide gas into a slurry of a selectively burned or calcined magnesium-containing limestone which has been indirectly burned or calcined in fine particle form by contact with a hot surface, as distinguished from directly burning or calcination by contact with a flame or hot combustion gases, to convert the magnesium oxide into water-soluble magnesium hydrosulfide; separating the solution of magnesium hydrosulfide from the solids; decomposing the separated solution of magnesium hydrosulfide, by heat, into insoluble magnesium hydroxide; separating the precipitated magnesium hydroxide from the aqueous medium; and calcining the magnesium hydroxide to produce magnesium oxide when that product is desired. The indirectly burned or calcined magnesium-containing limestone treated with the hydrogen sulfide gas in accordance with the invention will be a product in which at least about 85% of the magnesium carbonate has been converted to the oxide, but no more than 2.0% of the calcium carbonate has been converted to calcium oxide.

In the drawing, a preferred process is illustrated by means of a flow sheet, but it is to be understood that the invention is not to be limited to the details shown therein, and that other procedures falling within the scope of the invention may be used, if desired.

The term "magnesium-containing limestone" as used herein refers to any natural mixture of magnesium carbonate and calcium carbonate containing at least 15% magnesium (calculated as MgO and based upon the combined weight of calcium and magnesium calculated as calcium oxide and magnesium oxide), and includes the so-called "high magnesium limes," dolomites, high magnesium dolomites and impure magnesites. The preferred raw material is dolomite, which contains approximately equimolecular proportions of calcium carbonate and magnesium carbonate, and usually contains about 4% of impurities. The term "selectively calcined," as used herein, refers to a magnesium-containing limestone in which at least about 85% of the magnesium carbonate has been converted to the oxide but in which no more than about 2% of the calcium carbonate has been converted to calcium oxide. If the amount of magnesium carbonate converted to the oxide is less than about 85%, then the product is unreactive, or only sluggishly reactive, with hydrogen sulfide, whereas if more than about 2% of the calcium carbonate is converted to the oxide, high calcium concentrations will be encountered in the sulfided liquor and in the final product. As will be discussed more in detail hereinafter, it is preferable from the standpoint of the present process that the magnesium-containing limestone be calcined to a point where between about 95% to about 100% of magnesium carbonate is converted to the oxide, and here no significant amount of calcium carbonate is converted to calcium oxide.

As stated, the selectively calcined magnesium-containing limestone which is treated in accordance with the process of the present invention has been indirectly burned or calcined in fine particle form and in contact with a hot surface, that is the heat required is transmitted to the limestone through a surface, for example through a thin-walled cylinder, in contrast to the standard method of calcination which involves the burning of the limestone, usually in lump form, by direct contact with a flame or hot combustion gases. The particle size of the limestone indirectly calcined and used in accordance with the present process generally will be less than 20 mesh and preferably a major portion thereof will pass through a 100 mesh screen. The selectively calcined magnesium-containing limestone employed in accordance with the present invention may be indirectly calcined in contact with a hot surface by a variety of methods. A simple method of accomplishing this is to heat the limestone in particle form as described above, in a vessel on the outside of which a flame or hot combustion gas impinges, or the vessel may be equipped with electrical heating elements. A preferred and continuous method of indirectly calcining the limestone in particle form is by means of an inclined rotary kiln equipped with a plurality of tubes through which the comminuted limestone passes. The limestone becomes heated by contact with the inner surfaces of the tubes which are in turn heated by the impingement of a flame or hot combustion gases on the outside thereof or by electrical heating elements placed in contact with the tubes.

Since, in the magnesium-containing limestone, the magnesium carbonate is selectively calcined, the time and temperature conditions are selected to favor the decomposition of the magnesium carbonate without substantial decomposition of the calcium carbonate. It has been found in commercial calcining operations that magnesium carbonate usually decomposes to the oxide at about 1450° F., and that calcium carbonate usually decomposes to the oxide at about 1650° F. Therefore, these temperatures define a range within which selective calcination may be carried out. These temperatures are subject to slight variation where the calcium carbonate and magnesium carbonate are in such close association as occurs in the magnesium-containing limestone. Therefore, to insure a minimum of calcium carbonate calcination, the particles of magnesium-containing limestone are generally not heated beyond about 1600° F. The production of the selectively calcined product by the indirect method described, insures control of the temperature within the desired range so that, on the one hand, undesired calcination of the $CaCO_3$ is avoided and on the other over-burning of the magnesium oxide rendering it less active is eliminated. Likewise, the method provides an atmosphere rich in carbon dioxide in contact with the charge at all times which favors the aforesaid control. The exact temperatures employed will also depend, to some extent, upon the time during which the magnesium-containing limestone is subjected to heat, and upon the nature of the magnesium containing limestone employed. In any event, as stated the magnesium-containing limestone particles are heated to an extent to convert at least 85% of the magnesium carbonate present to the oxide but not to such a high temperature or for such a length of time that more than about 2% of the calcium carbonate is converted to the oxide. Preferably, the temperature, time and other conditions are selected so that between about 95% and about 100% of the magnesium carbonate is converted to the oxide without any significant decomposition of the calcium carbonate.

The particles of magnesium-containing limestone indirectly calcined, as above described, are mixed with water to form a slurry, and hydrogen sulfide gas is introduced into the slurry with agitation. The amount of water employed may vary widely. Since, however, the maximum concentration of the magnesium hydrosulfide formed is on the order of about 10%, calculated as MgO, it is generally desirable to have at least sufficient water present to accommodate substantially all of the magnesium oxide present when it goes into solution as the hydrosulfide. For this reason, it is generally desirable to employ at least enough water to provide a magnesium concentration, calculated as MgO, of about 10%.

The amount of water employed may be increased beyond this point to provide smaller concentrations of magnesium, although certain of the advantages of the present process are not fully realized if the amount of water employed is in excess of that which will provide a magnesium concentration, calculated as MgO, of about 4%. In practice, it has been found that an especially desirable working concentration of magnesium, calculated as MgO, is between about 5% and about 8%.

When the hydrogen sulfide gas is introduced into the above-described slurry, the slurry is advantageously continuously agitated to insure complete mixing of the gas with the particles and preferably, countercurrent flow is employed in sulphiding the magnesium oxide. As will be discussed more in detail hereinafter in connection with the tables and the examples, the indirectly calcined magnesium-containing limestone employed in accordance with the present process exhibits a marked affinity for the hydrogen sulfide gas, in that the hydrogen sulfide when substantially cool, preferably below 120° F., rapidly, selectively reacts with the magnesium oxide converting it into the water soluble magnesium-hydrosulfide, $Mg(SH)_2$. The hydrogen sulfide does not attack the calcium carbonate, and some other impurities; those impurities, such as iron which are attacked form insoluble sulfides and these materials remain suspended in the medium. It is usually desirable to pass an excess of hydrogen sulfide through the slurry and the excess is recovered and used in the treatment of additional amounts of the indirectly calcined limestone. Variations of temperature within a moderate range, for example from about 60° F. to 120° F., do not affect the reaction rate appreciably, although temperatures above about 120° F. may have an adverse effect in tending to dissociate the magnesium hydrosulfide formed. Preferably a temperature between about 75° F. and 100° F. is employed. Since some heat is evolved during the reaction it is generally desirable to employ water at or below room temperatures to allow for a few degrees rise due to the heat of reaction. Hydrogen sulfide is maintained in contact with the slurry until at least the greater part of the magnesium oxide, preferably at least 90%, has been converted to the hydrosulfide and, depending on the equipment used, this treatment may continue for two or three hours or more.

When the desired quantity of the magnesium oxide content of the slurry has been converted to magnesium hydrosulfide and, as such, is in solution, the remaining solids are separated therefrom by settling, centrifuging or filtration or a combination thereof.

The solution containing the magnesium hydrosulfide is then heated to decompose the magnesium hydrosulfide forming a precipitate of magnesium hydroxide and evolving hydrogen sulfide gas, which is advantageously recycled and used in sulfiding further quantities of the selectively burned limestone. While ordinary heating may be used, it is generally desirable, because of the danger of scaling on hot surfaces in contact with the solution, to supply the heat by the introduction of steam into the solution. Steam may be so introduced into the solution until the magnesium has substantially completely precipitated as the hydroxide. A particularly desirable method of decomposing the magnesium hydrosulfide is by the use of a bubble cap tower in which the solution of magnesium hydrosulfide passes down through the tower in countercurrent flow communication with steam introduced at the bottom of the tower. The particular temperature employed will depend on the pressure and to some extend on the concentration. At atmospheric pressure a temperature in excess of about 175° F. is advantageously employed. Preferably the solution will be heated to cause it to boil under the pressure conditions existing, for example 218° F. at 2 pounds gauge pressure.

The precipitated magnesium hydroxide is then collected by filtration or centrifuging, and dried, and the dried magnesium hydroxide converted to the oxide by calcination by well-known methods, for example by heating in the neighborhood of 1000° F. or higher if it is desirable to burn out the last traces of sulfur. Obviously, if relatively pure magnesium hydroxide is desired rather than relatively pure magnesium oxide, the final calcining step is omitted.

The operation of the process of the present invention may be more clearly understood from a consideration of the drawing which represents a flow diagram of the preferred form of the process. As shown in the drawing, the magnesium-containing limestone, already pulverized into fine particle size, is fed to an indirect burning kiln 1, such as the rotary tube-shell arrangement described above, in which the material treated does not come into contact with a flame or hot combustion gases. The temperature and time of treatment in this kiln provides the desired selective calcination, viz. the decomposition of substantially all of the magnesium carbonate without decomposing a substantial amount of the calcium carbonate. The selectively calcined material is then formed into a slurry with water, such as in slurrying tank 2. The slurry is then treated with hydrogen sulfide gas. While this treatment may take place in one or more tanks, a preferred method is to pass the slurry serially through a plurality of treating vessels such as is shown by sulfiding tanks 3, 4, 5 and 6, countercurrent to the flow of hydrogen sulfide. By the time the slurry reaches the exit end of tank 6, substantially all of the magnesium oxide has been converted to the water-soluble magnesium hydrosulfide. The calcium carbonate and impurities remain suspended and are separated from the solution of magnesium hydrosulfide by filter 7. Any residual very fine solids may be removed as by polish filter 8. The clear magnesium hydrosulfide solution is then decomposed by heat, preferably by steam, into magnesium hydroxide and hydrogen sulfide gas as in decomposer 9, which is preferably a bubble cap tower containing a plurality of plates and in which the solution enters the top of the tower with steam admitted at the bottom and flowing countercurrent to the solution. The liberated hydrogen sulfide cooled by contact with the feed liquid, is advantageously added to the hydrogen sulfide used in this treatment of further amounts of the selectively calcined limestone. The suspended magnesium hydroxide is separated from the aqueous medium as by a filter 10, and dried in dryer 11. The dried magnesium hydroxide may then be stored or marketed as such for subsequent calcination, or it may be immediately calcined by well-known means as in kiln 12.

The employment of the indirectly selectively calcined particles of the magnesium-containing limestone in the process as described leads to many important advantages over prior processes. Certain of these advantages are based on the discovery that the magnesium-containing limestone, when selectively calcined in particle form and indirectly by contact with hot surfaces to form the product hereinabove described, exhibits a much greater affinity for hydrogen sulfide than do the selectively calcined magnesium-containing limestones when calcined in the usual manner by direct contact with a flame or hot combustion gases. While the exact reason for this is not fully understood it has been noted that the indirectly calcined material is much more porous than is the directly calcined material and this increased porosity may result in the increased activity. As the direct result of this increased affinity for hydrogen sulfide, reaction times are substantially decreased. Even more important, however, is the fact that, by the use of the indirectly calcined material, higher concentrations of magnesium in the form of the hydrosulfide are obtainable than has been possible with the directly calcined material. The concentrations available by the use of the indirectly calcined material are on the order of twice as much as that obtainable heretofore with the directly calcined material. This means, of course, that the amount of water needed is substantially less, or, conversely, that for a given volume of slurry the amount of desired product recovered is as high as twice as much, as that recovered by prior processes. Furthermore, as stated, there is a considerable saving in the amount of heat required to decompose the magnesium hydrosulfide because the volume of solution is reduced and the equipment used can be correspondingly smaller in size.

The advantages of the present process may be more readily appreciated from a consideration of the following tables in which various features of the present process and those of prior processes are compared.

TABLE I

In this table are set forth comparative figures on the percent recovery of magnesium oxide based on the amount of available magnesium oxide in the selectively calcined magnesium-containing limestone, after one hour treatment with hydrogen sulfide gas. In all cases the limestone was Pennsylvania dolomite containing equimolecular proportions of magnesium carbonate and calcium carbonate. The indirectly calcined dolomite was prepared in accordance with Example I hereinafter set forth, and the directly burned dolomite was prepared by the standard procedure involving the burning of crushed dolomite in the presence of flame and combustion gases in a kiln.

| Percent MgCO₃ calcined | Percent CaCO₃ calcined | Percent MgO Recovered (after 1 hour of treatment) | |
|---|---|---|---|
| | | Indirectly calcined dolomite | Directly calcined dolomite |
| 100 | 2 | 78 | 74 |
| 100 | 0 | 80 | 74 |
| 98 | 0 | 82 | 73 |
| 92 | 0 | 83 | 70 |
| 86 | 0 | 80 | 67 |

TABLE II

In this table, the rates of reaction of two types of directly and selectively calcined Pennsylvania dolomite with hydrogen sulfide are compared with the rate of reaction of indirectly and selectively calcined Pennsylvania dolomite. In all cases, the dolomite was selectively calcined to the point where 98% of the magnesium carbonate had been calcined without any calcination of the calcium carbonate. In all cases, the selectively calcined dolomite was freshly prepared and had a particle size of less than 100 mesh, and was formed into a water slurry to provide a magnesium oxide concentration of 53 grams per liter. In each case, the slurries were at room temperature and excess hydrogen sulfide gas was introduced at the same rate. The directly calcined dolomite A, was obtained by crushing the core of larger directly calcined dolomite lumps, while the directly calcined dolomite B was prepared by the controlled burning of crushed dolomite in the presence of flame and combustion gases.

| Sulfiding time (minutes) | Concentration of MgO in solution as the hydrosulfide in grams MgO per liter | | |
|---|---|---|---|
| | Indirectly calcined dolomite | Directly calcined dolomite A | Directly calcined dolomite B |
| 0 | | | |
| 15 | 29.13 | 18.84 | 12.26 |
| 30 | 37.02 | 25.45 | 22.80 |
| 60 | 43.92 | 31.15 | 30.87 |
| 90 | 46.98 | 32.95 | 36.37 |
| 120 | 48.98 | 34.25 | 38.87 |
| 150 | 49.98 | 35.95 | 40.07 |
| 180 | ¹ 50.98 | ² 36.65 | ³ 41.17 |

¹ This represents 96.0% of the MgO available.
² This represents 69.1% of the MgO available.
³ This represents 78.7% of the MgO available.

The following example illustrates the operation of the present process, and is not to be considered as limiting the scope of invention.

*Example I*

In this example Pennsylvania dolomite containing equimolecular proportions of magnesium carbonate and calcium carbonate and about 4% of impurities was indirectly selectively calcined in a special kiln. The kiln comprised a steel shell eighteen inches in diameter and fourteen feet in length. Inside the shell were 6 three-inch stainless steel tubes, equidistantly placed within the shell. The shell was inclined slightly and at the lower end was an oil burner. The flame and combustion gases were swept through the shell impinging against the outsides of the tubes. The heat was distributed within the shell so that at the upper end of the tubes where the crushed dolomite entered, the temperature was about 680° F. and increased progressively until, at a point ten feet from the entrance, the temperature was about 1420° F. Over the next two feet the temperature increased to a maximum of about 1550° F. and then decreased until, at the lower end of the shell, the temperature was about 1470° F. Thus, the first ten feet of tubing functioned as a preheating zone, while the bulk of calcination occurred in the last four feet of tubing.

In this example, the rate of dolomite input was 45 lbs. per hour, and the rate of revolution of the shell, the degree of inclination of the shell and the temperatures were controlled so that substantially 98% of the magnesium carbonate content thereof was calcined to the oxide without any calcination of the calcium carbonate. Thirty-two pounds of such selectively calcined dolomite were produced per hour.

The resulting selectively and indirectly calcined dolomite was then mixed with water to provide a concentration of about 54 grams MgO per liter, and hydrogen sulfide gas was introduced into the slurry. After two hours 93% of the magnesium oxide had gone into solution, the calcium carbonate remaining in suspension. The suspended solids were filtered from the magnesium hydrosulfide solution. The solution was then fed to the top of a bubble cap tower into the bottom of which steam was fed. The ascending steam heated the descending solution, causing the magnesium hydrosulfide to decompose, precipitating magnesium hydroxide and liberating hydrogen sulfide gas which was removed from the top of the tower and was available for use in subsequent cycles of the process.

The magnesium hydroxide suspension recovered from the bottom of the tower was filtered to recover the magnesium hydroxide, which was then dried and calined by well-known methods to produce substantially pure magnesium oxide.

The resulting magnesium oxide possessed a purity of 99.5% and represented an overall recovery of 85% of the total MgO input.

By varying the conditions during calcination, selectively calcined products have been obtained wherein only 85% of the magnesium carbonate has been calcined with no calcination of calcium carbonate, and also wherein not only was all the magnesium carbonate calcined but also as much as 2% of the calcium carbonate. Data using selectively and indirectly calcined material within this range is compared with directly calcined material in certain of the foregoing tables.

Considerable modification is possible in the steps of the process, as well as in the methods employed in producing the indirectly calcined magnesium-containing limestone, without departing from the essential features of the invention.

I claim:

1. The steps in the process of producing a substantially pure magnesium compound selected from the group consisting of the oxide and hydroxide which comprise indirectly calcining a magnesium-containing limestone having a particle size less than 20 mesh by contact with a hot surface and out of contact with a flame and hot combustion gases to provide a selectively calcined, finely divided magnesium-containing limestone in which at least about 85% of the magnesium carbonate has been converted to the oxide but in which no more than about 2% of the calcium carbonate has been converted to calcium oxide; forming an aqueous slurry of said indirectly calcined, finely divided magnesium-containing limestone; passing hydrogen sulfide into said slurry, said slurry being at a temperature between about 60° and about 120° F., to convert magnesium oxide to magnesium hydrosulfide; separating the solution of magnesium hydrosulfide from the solids; heating said solution to decompose the magnesium hydrosulfide to form magnesium hydroxide; and separating the magnesium hydroxide from the solution.

2. The steps in the process of claim 1 wherein the amount of indirectly calcined magnesium-containing limestone in the aqueous slurry will provide a magnesium concentration, calculated as MgO, of between about 5% and about 10%.

3. The process of claim 2 wherein the magnesium hydrosulfide in the solution is decomposed to the hydroxide by passing steam in contact with the solution.

4. The steps in the process of claim 1 wherein the magnesium-containing limestone is dolomite.

5. The steps in the process of claim 4 wherein the magnesium-containing limestone is dolomite; wherein the particle size of the dolomite is less than 100 mesh and wherein the amount of indirectly calcined dolomite in the aqueous slurry will provide a magnesium concentration, calculated as MgO, of between about 5% and about 10%.

6. The process of producing substantially pure magnesium oxide which comprises indirectly calcining a magnesium-containing limestone having a particle size less than 20 mesh by contact with a hot surface and out of contact with a flame and hot combustion gases to provide a selectively calcined finely divided magnesium-containing limestone in which at least about 85% of the magnesium carbonate has been converted to the oxide but in which no more than about 2% of the calcium carbonate has been converted to calcium oxide; forming an aqueous slurry of said indirectly calcined finely divided magnesium-containing limestone; passing hydrogen sulfide into said slurry, said slurry being at a temperature between about 60° and about 120° F., to convert magnesium oxide to magnesium hydrosulfide; separating the solution of magnesium hydrosulfide from the solids; heating said solution to decompose the magnesium hydrosulfide to form magnesium hydroxide; separating the magnesium hydroxide from the solution; and calcining the magnesium hydroxide to form magnesium oxide.

7. The process of claim 6 wherein the magnesium hydro-sulfide in the solution is decomposed to the hydroxide by heating the solution by passing steam in contact with the solution.

8. The process of claim 6 wherein the magnesium-containing limestone indirectly calcined is dolomite; wherein the amount of indirectly calcined dolomite in the aqueous slurry will provide a magnesium concentration, calculated as MgO, of between about 5% and about 10%.

9. The process of claim 6 wherein the magnesium-containing limestone indirectly calcined is dolomite; wherein the indirect calcination takes place at a temperature between about 1450° F. and about 1650° F. and provides a selectively calcined dolomite in which at least about 95% of the magnesium carbonate has been converted to the oxide but in which substantially no calcium carbonate has been converted to the oxide; wherein the particle size of the dolomite indirectly calcined is less than 100 mesh, and wherein the amount of indirectly calcined dolomite in the aqueous slurry will provide a magnesium concentration, calculated as MgO, of between about 5% and about 10%.

10. The process of claim 9 wherein the magnesium hydrosulfide in the solution is decomposed to the hydroxide by heating the solution by passing steam in contact with the solution.

GEORGE G. MEGRAIL.

References Cited in the file of this patent

UNITED STATES PATENTS

| Number | Name | Date |
| --- | --- | --- |
| 1,273,110 | Mitchell | July 16, 1918 |
| 1,495,813 | Shaw et al. | May 27, 1924 |
| 1,894,184 | Loomis | Jan. 10, 1933 |
| 1,953,419 | Hoge | Apr. 3, 1934 |
| 2,118,353 | MacIntire | May 24, 1938 |
| 2,354,584 | Elkington et al. | July 25, 1944 |